( 12 ) United States Patent
Jitsugiri et al.

(10) Patent No.: US 8,101,300 B2
(45) Date of Patent: Jan. 24, 2012

(54) CATHODE ACTIVE MATERIAL FOR NON-AQUEOUS ELECTROLYTE SECONDARY BATTERY AND ITS PRODUCTION METHOD

(75) Inventors: Yukio Jitsugiri, Chigasaki (JP); Yukiko Amagasaki, Chigasaki (JP); Takeshi Kawasato, Chigasaki (JP); Naoshi Saito, Chigasaki (JP); Tokumitsu Kato, Chigasaki (JP); Yukimitsu Wakasugi, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 0 days.

(21) Appl. No.: 12/047,481

(22) Filed: Mar. 13, 2008

(65) Prior Publication Data

US 2008/0160414 A1 Jul. 3, 2008

Related U.S. Application Data

(63) Continuation of application No. PCT/JP2007/053968, filed on Mar. 1, 2007.

(30) Foreign Application Priority Data

Mar. 2, 2006 (JP) .................................. 2006-056610

(51) Int. Cl.
 *H01M 4/13* (2010.01)
 *H01M 4/58* (2010.01)
(52) U.S. Cl. ................................. 429/231.95; 429/218.1
(58) Field of Classification Search .................. 429/231, 429/223–4
 See application file for complete search history.

(56) References Cited

U.S. PATENT DOCUMENTS

| 6,254,655 | B1 * | 7/2001 | Goertz | 71/28 |
| 2004/0091779 | A1 * | 5/2004 | Kang et al. | 429/231.1 |
| 2005/0250013 | A1 * | 11/2005 | Tatsumi et al. | 429/231.95 |
| 2006/0154146 | A1 * | 7/2006 | Kawasato et al. | 429/223 |
| 2006/0245999 | A1 * | 11/2006 | Shen et al. | 423/608 |
| 2009/0014062 | A1 * | 1/2009 | Kayama et al. | 136/256 |

FOREIGN PATENT DOCUMENTS

| JP | 2855877 | 11/1998 |
| JP | 2003-178759 | 6/2003 |
| JP | 2003331841 A * | 11/2003 |
| JP | 2004-175609 | 6/2004 |
| JP | 2004-311408 | 11/2004 |
| JP | 2005-50779 | 2/2005 |
| JP | 2005-78800 | 3/2005 |
| JP | 2005-85635 | 3/2005 |
| JP | 2005-190900 | 7/2005 |
| JP | 2005-310744 | 11/2005 |
| JP | 2005-317499 | 11/2005 |
| JP | 2006-31987 | 2/2006 |
| JP | 2006-196433 | 7/2006 |
| JP | 2007-5073 | 1/2007 |
| WO | WO 2005071704 A2 * | 8/2005 |
| WO | WO 2005/112152 A1 | 11/2005 |
| WO | WO 2005106993 A1 * | 11/2005 |

OTHER PUBLICATIONS

Kanzaki et al., Machine translation of JP 2003331841 A, Nov. 2003.*
U.S. Appl. No. 12/100,567, filed Apr. 10, 2008, Wakasugi et al.
Taiwanese Office Action issued Dec. 30, 2010, in Patent Application No. 096107278 (with English-language translation).
Office Action issued Mar. 15, 2011 in Japan Application No. 2007-541529 (With English Translation).

* cited by examiner

*Primary Examiner* — Basia Ridley
*Assistant Examiner* — Sean P Cullen
(74) *Attorney, Agent, or Firm* — Oblon, Spivak, McClelland, Maier & Neustadt, L.L.P.

(57) ABSTRACT

A cathode active material for a non-aqueous electrolyte secondary battery comprises a lithium-containing composite oxide powder, which is represented by the formula $Li_pN_xM_yO_zF_a$ wherein N is at least one element selected from the group consisting of Co, Mn and Ni, M is zirconium and optionally at least one element selected from the group consisting of Al, alkaline earth metal elements and transition metal elements other than the element N, $0.9 \leq p \leq 1.1$, $0.965 \leq x \leq 1.00$, $0 \leq y \leq 0.035$, $1.9 \leq z \leq 2.1$, $x+y=1$ and $0 \leq a \leq 0.02$, an atomic ratio of zirconium/the element N is in a range of at least 1.0 to 4.0. A method to produce the cathode active material is provided.

10 Claims, No Drawings

CATHODE ACTIVE MATERIAL FOR NON-AQUEOUS ELECTROLYTE SECONDARY BATTERY AND ITS PRODUCTION METHOD

TECHNICAL FIELD

The present invention relates to a cathode active material for a non-aqueous electrolyte secondary battery such as a lithium ion secondary battery, its production method and a lithium secondary battery containing the cathode active material for the electrolyte secondary battery.

BACKGROUND ART

Recently, along with rapid development of information-related equipments and communications equipments such as personal computers and mobile phones, a demand for a non-aqueous electrolyte secondary battery such as a lithium secondary battery which is small in size and light in weight and which has a high energy density, has been high. As a cathode active material for the non-aqueous electrolyte secondary battery, a composite oxide of lithium and a transition metal, such as $LiCoO_2$, $LiNiO_2$, $LiNi_{0.8}Co_{0.2}O_2$ and $LiMn_2O_4$, has been known.

Among others, the lithium secondary battery using the lithium cobalt composite oxide ($LiCoO_2$) as the cathode active material and using a lithium alloy or carbon such as graphite or carbon fiber as a negative electrode, provides a high voltage at a level of 4 V, and is thus widely being used as a battery having a high energy density.

However, even in the case where the lithium cobalt composite oxide was used as the cathode active material, there were problems that it was insufficient in terms of cyclic charge and discharge properties relating to reduction of the discharge capacity caused by repetitive charge and discharge cycles, or in terms of thermal stability in heating durations after charging.

In order to solve such problems, Patent Documents 1 and 2 describe the lithium cobalt composite oxide containing zirconium in a concentration of at least 20% as an atomic ratio of zirconium and cobalt in a range of from 50 nm to 100 nm in a surface layer of the lithium cobalt composite oxide powder by adding zirconium by a solid-phase method using zirconium oxide as a raw material, in synthesis of the lithium cobalt composite oxide.

Furthermore, Patent Documents 3 and 4 describe the lithium cobalt composite oxide in which a zirconium-containing compound is attached to a surface of the lithium cobalt composite oxide powder in such a condition that at least 80% of the powder surface is exposed without being dissolved nor diffused, by adding zirconium by a solid-phase method using zirconium oxide as a raw material, in synthesis of the lithium cobalt composite oxide. In Patent Document 5 a powdery zirconium oxide is used as a compound for a zirconium source and raw material powders mixed are fired at a temperature as high as 900° C., to synthesize the lithium cobalt composite oxide. The lithium cobalt composite oxide obtained in this method contains zirconium in such a state that zirconium is dissolved and diffused into an inside of the composite oxide powder.

Furthermore, Patent Document 6 describes a lithium cobalt composite oxide, the powder surface of which is coated with zirconium or with zirconium and aluminum, using a zirconium-containing suspension or a zirconium and aluminum-containing suspension. Patent Document 7 describes the zirconium-coated lithium cobalt composite oxide in which the lithium cobalt composite oxide is coated with zirconium, using an aqueous solution of zirconyl nitrate having the acidity of pH of at most 1.5, followed by firing at a relatively high temperature of 600° C. On the other hand, it is known that the coating treatment with use of such an acidic aqueous solution results in dissolving the surface of the composite oxide powder to elute a part of the elements contained in the composite powder such as lithium and cobalt.

Patent Document 1: JP-A-2004-311408
Patent Document 2: JP-A-2005-190900
Patent Document 3: JP-A-2005-85635
Patent Document 4: JP-A-2005-50779
Patent Document 5: Japanese Patent No. 2,855,877
Patent Document 6: JP-A-2003-178759
Patent Document 7: JP-A-2004-175609

DISCLOSURE OF THE INVENTION

Object to be Accomplished by the Invention

When the above-mentioned lithium-containing composite oxide powders obtainable in Patent Documents 1 to 7 were used as the cathode active materials for non-aqueous electrolyte secondary batteries such as lithium secondary battery, the batteries did not necessarily have a large volume capacity density and failed to satisfy the safety and the cyclic charge and discharge properties sufficiently and simultaneously, so that further improvement was demanded.

Furthermore, in the case where the negative electrode is lithium in the lithium secondary battery, the charging voltage is usually 4.3 V and only from 50 to 60% of the cathode active material is used in charging and discharging. It is thus desired to further improve the discharge capacity, by increasing an amount of the cathode active material to be utilized, by using a higher charging voltage. For example, if the charging voltage is 4.5 V, about 70% of the cathode active material can be used, so as to dramatically improve the discharge capacity. However, the above lithium-containing composite oxides obtained in Patent Documents 1 to 7 show insufficient cyclic charge and discharge properties even at the charging voltage of 4.3 V and the cyclic charge and discharge properties further degrade at such a high operating voltage as the charging voltage of 4.5 V.

It is an object of the present invention to provide a cathode active material for a non-aqueous electrolyte secondary battery used in a lithium secondary battery or the like, which has a high volume capacity density, high safety and excellent cyclic charge and discharge properties, even at a high operating voltage, its production method and a non-aqueous electrolyte secondary battery such as the lithium secondary battery containing the cathode active material.

Means to Accomplish the Object

The present inventors have conducted extensive studies and as a result, have found that the above-mentioned object was accomplished by using a lithium-containing composite oxide powder having a specific composition in which zirconium was contained in a relatively high concentration of an atomic ratio (zirconium/element N) of at least 1.0 in the surface layer of the powder in the extremely small thickness of 5 nm. Namely, according to the studies conducted by the present inventors, it was found that the above-mentioned conventional lithium-containing composite oxide powders contained zirconium but the zirconium content was basically not large and particularly the content in the surface layer thereof was not large.

For example, the above-mentioned lithium-containing composite oxide powders in Patent Documents 1 to 5 contain zirconium in a substantially uniform concentration over the entire region, but the atomic ratio (zirconium/element N) in the surface layer within 5 nm of the powder is at most about 0.7 in each case. Furthermore, in Patent Document 6 and Patent Document 7, the surface of the lithium-containing composite oxide powder is treated with a suspension or solution containing zirconium, to impregnate zirconium, but dissolution or, dissolution and diffusion of zirconium is brought about in the preparation process, and the atomic ratio (zirconium/element N) in the surface layer within 5 nm of the powder was at most about 0.7 in each case.

The mechanism as to why such excellent properties are accomplished by the lithium-containing composite oxide powder in which zirconium is contained in the relatively high concentration in the surface layer within the very thin region is not necessarily clearly understood, but is considered as follows. Namely, when charge and discharge are repeated with the non-aqueous electrolyte secondary battery such as the lithium secondary battery in which the lithium-containing composite oxide powder is used as the positive electrode, decomposition of the electrolyte occurs at the interface between the lithium-containing composite oxide powder and the electrolyte to generate a gas containing carbon dioxide. It is considered, however, that if zirconium exists in a relatively high concentration in the surface region of the lithium-containing composite oxide powder, zirconium reacts with active sites on the surface of the lithium-containing composite oxide powder, to suppress the above-mentioned decomposition of the electrolyte, whereby the high operating voltage, high volume capacity density and high safety are maintained. In addition, it is considered that if zirconium exists in a relatively high concentration in the surface region of the lithium-containing composite oxide powder, it suppresses elution of an active component in the lithium-containing composite oxide into the electrolyte, whereby the cyclic charge and discharge properties are considerably improved not only at the operating voltage of 4.3 V but also at a particularly high operating voltage of 4.5 V.

As described above, the present invention is based on the above-mentioned novel finding and has the following gists.

(1) A cathode active material for a non-aqueous electrolyte secondary battery, which comprises a lithium-containing composite oxide powder represented by the formula $Li_p N_x M_y O_z F_a$ (wherein N is at least one element selected from the group consisting of Co, Mn and Ni, M is at least one element selected from the group consisting of Al, alkaline earth metal elements and transition metal elements other than the element N, $0.9 \leq p \leq 1.1$, $0.965 \leq x \leq 1.00$, $0 < y \leq 0.035$, $1.9 \leq z \leq 2.1$, $x+y=1$ and $0 \leq a \leq 0.02$), and a surface layer of which contains zirconium, said surface layer within 5 nm having an atomic ratio (zirconium/the element N) of at least 1.0.

(2) The cathode active material for a non-aqueous electrolyte secondary battery according to the above (1), wherein the lithium-containing composite oxide powder contains zirconium in an atomic ratio of from 0.00005 to 0.01 relative to a total of the element M and the element N.

(3) The cathode active material for a non-aqueous electrolyte secondary battery according to the above (1) or (2), wherein the lithium-containing composite oxide is at least one member selected from the group consisting of lithium cobaltate, lithium nickel cobalt oxide and lithium nickel cobalt manganese oxide.

(4) The cathode active material for a non-aqueous electrolyte secondary battery according to any one of the above (1) to (3), wherein the lithium-containing composite oxide is lithium cobaltate and the element M contains at least one of zirconium, magnesium and aluminum.

(5) The cathode active material for a non-aqueous electrolyte secondary battery according to any one of the above (1) to (4), wherein the lithium-containing composite oxide powder further contains carbon in the surface layer within 5 nm.

(6) A positive electrode for a lithium secondary battery comprising a cathode active material, an electrical conducting material and a binder, wherein the cathode active material contains the cathode active material for a non-aqueous electrolyte secondary battery as defined in any one of the above (1) to (5).

(7) A lithium secondary battery comprising a positive electrode, a negative electrode and a non-aqueous electrolyte, wherein the positive electrode is the cathode active material for a non-aqueous electrolyte secondary battery as defined in the above (6).

(8) A process for producing the cathode active material for a non-aqueous electrolyte secondary battery as defined in any one of the above (1) to (4), comprising step 1 of stirring a lithium-containing composite oxide powder while adding a zirconium-containing aqueous solution at a pH of from 3 to 12, is added to obtain a zirconium-added powder, and step 2 of firing the zirconium-added powder obtained in the step 1, in an oxygen-containing atmosphere.

(9) The process for producing the cathode active material for a non-aqueous electrolyte secondary battery according to the above (8), wherein the step 1 comprises stirring the lithium-containing composite oxide powder by means of a agitator with a low shearing strength such as a drum mixer or a Solidair while the zirconium-containing aqueous solution at a pH of from 3 to 12 is sprayed thereto, and the step 2 comprises firing the zirconium-added powder at from 200 to 600° C.

(10) The process for producing a cathode active material for a non-aqueous electrolyte secondary battery according to the above (8) or (9), wherein the zirconium-containing aqueous solution at a pH of from 3 to 12 contains zirconium ammonium carbonate or halogenated zirconium ammonium.

Effects of the Invention

According to the present invention, it is possible to provide a cathode active material for a non-aqueous electrolyte secondary battery comprising a lithium-containing composite oxide powder with high operating voltage, high volume capacity density, high safety and excellent cyclic charge and discharge properties, without reduction in the volume capacity density and safety, a process for producing the cathode active material and a non-aqueous electrolyte secondary battery utilizing the cathode active material.

BEST MODE FOR CARRYING OUT THE INVENTION

The lithium-containing composite oxide according to the present invention is represented by the general formula $Li_p N_x M_y O_z F_a$. In the formula, $0.9 \leq p \leq 1.1$, preferably $0.95 \leq p \leq 1.05$; $0.965 \leq x \leq 1.00$, preferably $0.975 \leq x \leq 0.995$; $0 < y \leq 0.035$, preferably $0.005 < y \leq 0.025$. When the element M contains zirconium, y is figured out from zirconium in both of the surface layer and inside of the lithium-containing composite oxide powder. In addition, $1.9 \leq z \leq 2.1$, preferably $1.95 \leq z \leq 2.05$; $0 \leq a \leq 0.02$, preferably $0 \leq a \leq 0.01$.

Furthermore, when the above-mentioned lithium-containing composite oxide contains no fluorine, the discharge capacity tends to be higher than in the case where fluorine is contained, therefore, a=0 is preferred in the case of putting emphasis on the capacity. On the other hand, when the composite oxide contains fluorine, it becomes a cathode active material having a part of its oxygen substituted by fluorine and the safety tends to be further improved; therefore, the range of 0<a≦0.02 is preferred in the case of putting emphasis on the safety.

The element N is at least one element selected from the group consisting of cobalt, manganese and nickel, and a single use of cobalt or a combinational use of cobalt-manganese-nickel is preferred from the viewpoint of practical use, and in the case of putting emphasis on the discharge capacity, the single use of cobalt is particularly preferred.

The element M is at least one element selected from the group consisting of Al, the alkaline earth metal elements and the transition metal elements other than the element N. Among others, the element M is preferably at least one element selected from the group consisting of Ti, Zr, Hf, V, Nb, Ta, Mo, Mg, Ca, Sr, Ba and Al. Furthermore, it is more preferably at least one member selected from the group consisting of Ti, Zr, Hf, Mg and Al, and particularly preferably at least one member selected from the group consisting of Zr, Mg and Al, from the viewpoints of capacity development properties, safety and cyclic charge and discharge properties.

In the case where the element M contains magnesium, magnesium is preferably contained in an atomic ratio of from 0.0005 to 0.03 and particularly preferably from 0.001 to 0.020, relative to a total of the element N and the element M. Likewise, in the case where the element M contains aluminum, it is preferably contained in an atomic ratio of from 0.0005 to 0.03 and particularly preferably from 0.001 to 0.020, relative to the total of the element N and the element M.

Zirconium contained in the lithium-containing composite oxide powder of the present invention is preferably from 0.00005 to 0.01, more preferably from 0.0001 to 0.005, and particularly preferably from 0.0005 to 0.005, as an atomic ratio relative to the total of the element M and the element N. The zirconium content here means a total of zirconium in the surface layer and the inside of the lithium-containing composite oxide powder. Furthermore, the total of the element M and the element N means a total of the element M and the element N contained in the surface layer and the inside of the lithium-containing composite oxide powder.

The lithium-containing composite oxide powder of the present invention contains zirconium particularly in the surface layer and the atomic ratio (zirconium/the element N) in the surface layer within 5 nm is at least 1.0. According to the present invention, the lithium-containing composite oxide powder is required to contain zirconium in the surface layer at a predetermined ratio, and the object of the present invention as described above cannot be accomplished outside the predetermined range. The reason why the zirconium content in the surface layer within 5 nm of the lithium-containing composite oxide powder is important is that zirconium existing near the surface of the lithium-containing composite oxide powder is important as described above, and in parallel the content of zirconium in the surface layer within 5 nm of particles can be analyzed by means of XPS analysis (X-ray photoelectron spectroscopy) as described below. In the present invention, the atomic ratio (zirconium/the element N) in the surface layer within 5 nm of the lithium composite oxide powder is preferably from 1.0 to 4.0, more preferably from 1.0 to 3.0 and particularly preferably from 1.5 to 2.5.

It is necessary in the lithium-containing composite oxide powder of the present invention that zirconium should be contained in the above-mentioned specific concentration in the surface layer, and zirconium may or may not exist inside of the powder. However, when zirconium is contained inside of the powder, it is not suitable to have zirconium contained in such a high concentration as in the surface layer within 5 nm as described above, because the volume capacity density comes to decrease.

In the present invention, the atomic ratio (zirconium/the element N) in the surface layer within 5 nm of the surface of the lithium composite oxide powder is readily analyzed by the XPS analysis (X-ray photoelectron spectroscopy). The XPS analysis can analyze a kind or abundance ratio of an element contained in a layer extremely near the surface of a particle. An example of the XPS analyzer may be ESCA5400 (non-monochromatic type) manufactured by PHI, Inc. When the atomic ratio (zirconium/the element N) is calculated by the XPS analysis in the present invention, it is preferred to perform the calculation using a peak which can be detected with high sensitivity and does not overlap a peak of another element as much as possible. Precisely, it is preferred to perform the calculation using the 3d peak with high sensitivity in the analysis of zirconium. Furthermore, it is preferred to perform the calculation using the 2p3 peak with high sensitivity in the analysis of cobalt, manganese or nickel. In the present invention, "the atomic ratio (zirconium/the element N) in the surface layer within 5 nm" will also be referred to simply as an "atomic ratio (Zr/N)" below.

The EPMA (X-ray micro analyzer) analysis or the EDS (energy dispersive X-ray spectrometry) analysis, which is frequently used for an elemental analysis of a powder surface, is an analysis that obtains information on an element in a relatively deep range from the surface of the powder to the surface layer of from 50 to 100 nm. Therefore, the EPMA analysis and EDS analysis are not suitable for the analysis for measuring the atomic ratio (Zr/N) required in the present invention.

Furthermore, the lithium-containing composite oxide of the present invention may contain carbon in the surface layer within 5 nm of the powder. An amount of carbon in the surface layer within 5 nm of the powder is preferably in a range of an atomic ratio (carbon/zirconium) of from 0.2 to 0.5, more preferably from 0.3 to 0.4. Thereafter, the "atomic ratio (carbon/zirconium) in the surface layer within 5 nm" will be referred to simply as an "atomic ratio (C/Zr)". The existence of such carbon is preferred because the cyclic charge and discharge properties of the lithium-containing composite oxide powder tend to be further improved.

The XPS analysis can be utilized as a method for measuring the atomic ratio (C/Zr) in the present invention. A value of the atomic ratio (C/Zr) may be obtained by calculation from the 1s peak for carbon and the 3d peak for zirconium. The FT-IR (Fourier transform infrared spectroscopy) analysis, thermal analysis and the like may be used for analyzing an existing condition of carbon contained in the surface layer within 5 nm from the surface of the powder.

The reason and mechanism as to why the cyclic charge and discharge properties are further improved when the atomic ratio (C/Zr) of the lithium-containing composite oxide is within the above range are not necessarily clearly understood. However, as a result of measurements by the above XPS analysis, FT-IR analysis, thermal analysis and so on, at least the following was found. A compound containing carbon is distributed in the surface layer within 5 nm of the lithium-containing composite oxide powder of the present invention and the compound containing carbon is preferably a compound containing carbon and zirconium, and particularly preferably a compound containing a carbonate group and zirconium such as $ZrOCO_3$, or a compound containing a carbonyl group and zirconium.

Then, a process for producing the lithium-containing composite oxide of the present invention will be explained, but the production process described below is just an example of a preferred method and the present invention is not limited thereto.

The lithium-containing composite oxide of the present invention may be synthesized by adding an aqueous solution containing zirconium at a pH of from 3 to 12 (hereinafter referred to also as "Zr aqueous solution") in a composite oxide such as $LiCo_2$ or $LiCo_{1/3}Mn_{1/3}Ni_{1/3}O_2$ (hereinafter referred to also as an "intermediate base material") preliminarily synthesized.

The above-mentioned intermediate base material can be any material as long as it is; a lithium-containing composite oxide available for use in the non-aqueous electrolyte secondary battery; and a lithium-containing composite oxide obtained after the addition of the Zr aqueous solution is one satisfying the above-mentioned general formula $Li_pN_xM_yO_zF_a$ (wherein N is at least one element selected from the group consisting of Co, Mn and Ni, M is at least one element selected from the group consisting of Al, the alkaline earth metal elements and the transition metal elements other than the element N, $0.9 \leq p \leq 1.1$, $0.965 \leq x \leq 1.00$, $0 < y \leq 0.035$, $1.9 \leq z \leq 2.1$, $x+y=1$ and $0 \leq a \leq 0.02$). A commercially available lithium-containing composite oxide may also be used. It may also be a lithium-containing composite oxide obtainable by the methods described in the above-mentioned Patent Documents 1 to 4 or a lithium-containing composite oxide obtainable by the method described in WO2005/112152.

Specific examples of the composite oxide to be used include a lithium-containing composite oxide which is obtained from a powder mixture of lithium carbonate, cobalt oxide, zirconium oxide and magnesium oxide and which has a composition ratio of Li:Co:Zr:Mg=1:0.99:0.005:0.005 as described in Example 1, paragraph [0035] in Patent Document 4, or $LiAl_{0.01}Co_{0.975}Mg_{0.01}Zr_{0.005}O_2$ synthesized by the method in Example 6 in WO2005/112152, and others.

There are no particular restrictions on the Zr aqueous solution as long as the solution is one obtained by dissolving a water-soluble compound containing zirconium and having a pH of from 3 to 12. Among others, an aqueous solution obtained by dissolving an ammonium complex containing zirconium is preferably applicable and an aqueous solution obtained by dissolving zirconium ammonium carbonate or halogenated zirconium ammonium is more preferably applicable. In a case where fluorine is further added in the cathode active material in the step of adding the Zr aqueous solution to the intermediate base material, it is particularly preferred to use fluorinated zirconium ammonium. In order to carry out this step at a low cost, it is particularly preferred to use zirconium ammonium carbonate. Furthermore, the pH of the Zr aqueous solution is more preferably in the range of from 5 to 10.

In addition, the above-mentioned Zr aqueous solution may contain a carboxylic acid. When the Zr aqueous solution contains a carboxylic acid, the carboxylic acid is preferably one having a carbon number of from 2 to 8 from the viewpoint of solubility in the aqueous solution, and above all, it is more preferably citric acid, tartaric acid, oxalic acid, malonic acid, maleic acid, malic acid, racemic acid, lactic acid or glyoxylic acid. When the Zr aqueous solution contains the carboxylic acid, the water solubility of zirconium contained in the Zr aqueous solution tends to improve and the zirconium dissolved in the Zr aqueous solution further tends to become less likely to precipitate.

The concentration of zirconium in the Zr aqueous solution is preferably a high concentration because it is necessary to remove the aqueous medium by drying in a subsequent step. However, if the zirconium concentration in the aqueous solution is too high, the viscosity becomes so high as to tend to complicate a contact process with the intermediate base material or handling of the aqueous solution. Therefore, the zirconium concentration in the Zr aqueous solution is preferably from 0.01 to 20 weight % and more preferably from 0.1 to 5 weight %.

A method of adding the Zr aqueous solution to the intermediate base material may be a means for spraying the Zr aqueous solution to the intermediate base material powder to impregnate it, a means for putting and agitating the intermediate base material powder in the Zr aqueous solution stored in a container, to impregnate it, or the like. Specific examples of agitators used for the agitation include a twin screw kneader, an axial mixer, a paddle mixer, a turbulizer, a drum mixer, a Redige mixer, and so on. Among others, it is preferred to adopt an agitator with a low shearing strength during the agitation. An agitation method with a low shearing strength during the agitation may preferably be the drum mixer or a Solidair. The drum mixer is particularly preferred among the agitators described above. By using the agitation method with the low shearing strength as described above, a dense and uniform film can be formed in a very near surface of the base material with a small amount of zirconium and the atomic ratio (Zr/N) falls within the predetermined region. As a result, the discharge capacity of the cathode active material tends to improve, such being preferred. A small-size agitator in a level of laboratory size may be used as the above-mentioned agitator, in addition to the commercially available machines.

In the case where the aqueous medium is removed from the zirconium-added powder obtained after adding the Zr aqueous solution to the intermediate base material, the removal treatment is carried out by drying the Zr-added powder preferably at from 50 to 200° C., particularly preferably at from 80 to 140° C., usually for from 0.1 to 10 hours. The aqueous medium in the Zr-added powder is not necessarily completely removed at this stage because it will be removed in the subsequent firing step, but it is preferably removed as much as possible because a large quantity of energy will be required to evaporate the water content in the firing step.

Furthermore, after the aqueous medium is removed from the zirconium-added powder as much as possible, the Zr-added powder is heated in an oxygen-containing atmosphere at from 200 to 600° C., usually for from 0.1 to 24 hours, thereby preferably obtaining the lithium-containing composite oxide of the present invention. In the heating and firing of the above-mentioned Zr-added powder, a more preferred temperature range is from 200 to 500° C. and a particularly preferred range is from 250 to 450° C. among others.

The cathode active material of the present invention obtained as described above preferably has an average particle size D50 of from 5 to 30 μm, particularly preferably from 8 to 25 μm, and preferably has a specific surface area of from 0.1 to 0.8 m²/g, particularly preferably from 0.20 to 0.50 m²/g. Furthermore, in the case where the element N is cobalt, the half-value width of the diffraction peak of the (110) plane at $2\theta=66.5\pm1°$ measured by the X-ray analysis using $CuK\alpha$ as a radiation source, is preferably from 0.08 to 0.20°, particularly preferably from 0.09 to 0.15°. The press density is preferably from 2.75 to 3.50 g/cm³, particularly preferably from 2.90 to 3.30 g/cm³. In the present invention, the press density means an apparent density of the powder when the lithium composite oxide powder is pressed under a pressure of 0.33 ton/cm². Furthermore, the lithium-containing composite oxide of the present invention has an amount of remaining alkali contained therein, preferably of at most 0.20 weight %, particularly preferably at most 0.10 weight %.

The average particle size in the present invention means a volume-based accumulative 50% size (D50) which is a particle size at a point of 50% on an accumulative curve when the accumulative curve is drawn so that a particle size distribution is obtained on the volume basis and the whole volume is 100%. The particle size distribution is obtained from a frequency distribution and accumulative volume distribution curve measured by means of a laser scattering particle size distribution measuring apparatus. The measurement of particle sizes is conducted by measuring the particle size distribution while the powder is sufficiently dispersed in an aqueous medium by an ultrasonic treatment or the like (for example, using Microtrack HRAX-100 manufactured by Leeds & Northrup Co.).

A method for obtaining a positive electrode for the lithium secondary battery with use of the cathode active material of the present invention may be carried out by conventional means. For example, a carbon type electroconductive material such as acetylene black, graphite or Ketjenblack, and a binder, are mixed in the powder of the cathode active material of the present invention, thereby obtaining a cathode mixture. The binder to be used may be polyvinylidene polyfluoride, polytetrafluoroethylene, polyamide, carboxy methylcellulose, acrylic resin, or the like.

A slurry obtained by dispersing the above cathode mixture in a dispersing medium such as N-methylpyrrolidone is applied onto a cathode current collector such as aluminum foil, dried, and pressed, thereby forming a cathode active material layer on the cathode current collector.

In the lithium secondary battery using the cathode active material of the present invention as the positive electrode, a solute for the electrolyte solution to be used is preferably at least one member selected from lithium salts, anions of which are, for example, $ClO_4^-$, $CF_3SO_3^-$, $BF_4^-$, $PF_6^-$, $AsF_6^-$, $SbF_6^-$, $CF_3CO_2^-$ and $(CF_3SO_2)_2N^-$. The above electrolyte solution or polymer electrolyte is preferably one wherein the electrolyte composed of a lithium salt is added in a concentration of from 0.2 to 2.0 mol/L to the above solvent or solvent-containing polymer. If the concentration is off this range, ionic conductivity will decrease and the electrical conductivity of the electrolyte will decrease. More preferably, the concentration is from 0.5 to 1.5 mol/L. A separator to be used may be a porous polyethylene or porous polypropylene film.

Furthermore, the solvent for the electrolyte solution to be used is preferably a carbonate ester. Either of a cyclic type and a chain type may be used as the carbonate ester. Examples of the cyclic type carbonate esters include propylene carbonate, ethylene carbonate (EC) and so on. Examples of the chain type carbonate esters include dimethyl carbonate, diethyl carbonate (DEC), ethyl methyl carbonate, methylpropyl carbonate, methyl isopropyl carbonate and so on.

The above carbonate ester may be a single carbonate ester, or a mixture of two or more of them. Furthermore, it may be used as mixed with another solvent. Moreover, depending upon the material of the anode active material, a chain carbonate ester and a cyclic carbonate ester may be used together, which can improve the discharge properties, the charge and discharge cyclic properties, or the charge and discharge efficiency.

It is also possible to use a gel polymer electrolyte obtained by adding a vinylidene fluoride-hexafluoropropylene copolymer (for example, KYNAR manufactured by Atochem Company) or a vinylidene fluoride-perfluoropropyl vinyl ether copolymer to one of these organic solvent and adding the solute as described above.

In the lithium battery using the cathode active material of the present invention as the positive electrode, the anode active material is a material that can occlude and discharge lithium ions. There are no particular limitations on the material forming the anode active material, and examples thereof include lithium metal, a lithium alloy, a carbon material, a carbon compound, a silicon carbide compound, a silicon oxide compound, titanium sulfide, a boron carbide compound, an oxide consisting mainly of a metal of Group 14 or Group 15 in the Periodic Table, and so on.

The carbon material to be used is one resulting from thermal decomposition of an organic material under various thermal decomposition conditions, artificial graphite, natural graphite, soil graphite, exfoliated graphite, flake graphite, or the like. The oxide applicable is a compound consisting mainly of tin oxide. The anode current collector to be used is a copper foil, nickel foil or the like.

There are no particular restrictions on the shape of the lithium secondary battery using the cathode active material of the present invention. A sheet (so-called film), folded, winding type cylinder with bottom or button shape etc., is selected for use depending upon the purpose.

EXAMPLES

Now, the present invention will be described in further detail with reference to Examples. However, the present invention is by no means restricted to such specific examples.

Example 1

Example of the Present Invention 1.68 g of an aqueous solution of zirconium sulfate (chemical formula: $H_2Zr(OH)_2(SO_4)_2$) having a zirconium content of 11.10 weight %, and 573.75 g of cobalt sulfate heptahydrate having a cobalt content of 20.96 weight % were added to 3 kg of water and stirred to prepare an aqueous solution in which the above compounds were uniformly dissolved. An aqueous solution of sodium hydroxide and the above zirconium-cobalt solution were dropwise added to 2 kg of water so that the pH became 11, to precipitate zirconium-cobalt hydroxides, thereby obtaining a co-precipitated raw material. After the above co-precipitated raw material was subjected sequentially to filtration, washing with water, and drying, the co-precipitated raw material was mixed with 75.82 g of lithium carbonate having a lithium content of 18.7 weight % and fired in an oxygen-containing atmosphere at 1010° C. for 14 hours to obtain an intermediate base material having a composition of $LiCo_{0.999}Zr_{0.001}O_2$.

Then, 5.68 g of water was added to 0.32 g of an aqueous solution of zirconium ammonium carbonate (chemical formula: $(NH_4)_2[Zr(CO_3)_2(OH)_2]$) having a zirconium content of 14.5 weight % to prepare a Zr aqueous solution with pH 6.0. While 6 g of the Zr aqueous solution thus prepared was sprayed over 100 g of the above intermediate base material, it was mixed by means of a drum mixer to obtain a zirconium-added powder. Then the zirconium-added powder was dried at 120° C. for 4 hours, and thereafter the powder was heated at 450° C. in an oxygen-containing atmosphere for 12 hours to obtain a substantially spherical powder of lithium-containing composite oxide (composition: $Li_{0.9995}Co_{0.9985}Zr_{0.0015}O_{1.999}$) of the present invention with an average particle size of 12.6 μm, D10 of 6.9 μm, D90 of 18.3 μm and a specific surface area of 0.31 m²/g. Zirconium contained in the lithium-containing composite oxide powder was in an atomic ratio of 0.0015 relative to a total of cobalt and zirconium.

With the lithium-containing composite oxide powder thus obtained, an X-ray diffraction spectrum was obtained with an X-ray diffraction apparatus (RINT 2100 model, manufactured by Rigaku Corporation). In the powder X-ray diffraction analysis using CuKα radiation, the half-value width of the diffraction peak of the (110) plane at 2θ=66.5±1° was 0.106°. The press density of this powder was 3.05 g/cm$^3$.

Furthermore, with the lithium-containing composite oxide powder obtained, the atomic ratio (Zr/N) of the composite oxide was measured by the XPS analysis and was found to be (Zr/N)=1.07. Then, the atomic ratio (C/Zr) of the composite oxide was measured as follows. Since a large amount of carbon atoms adhered to the surface of a particle due to contamination from the air, a range within about 3 nm from the surface of the particle was sputtered by an XPS analyzer. After the sputtering, the atomic ratio (C/Zr) was measured by the XPS analysis and found to be (C/Zr)=0.45.

The above lithium-containing composite oxide powder, acetylene black and polyvinylidene fluoride powder were mixed in a weight ratio of 90/5/5, and N-methylpyrrolidone was added to form a slurry, which was applied onto one side of aluminum foil having a thickness of 20 μm, by a doctor blade. After drying, roll pressing was carried out three times to obtain a positive electrode sheet for a lithium battery.

Then, four simplified sealed cell type lithium batteries made of stainless steel were assembled in an argon grove box, using one punched out from the positive electrode sheet as a positive electrode, a metal lithium foil having a thickness of 500 μm as a negative electrode, a nickel foil of 20 μm as a negative electrode current collector, a porous polypropylene having a thickness of 25 μm as a separator and a LiPF$_6$/EC+DEC(1:1) solution (which means a mixed solution of EC and DEC in a weight ratio (1:1) whose solute is LiPF$_6$; the same also applies to solvents as mentioned hereinafter) in a concentration of 1M as an electrolyte.

One battery out of the above four was charged up to 4.3 V at a load current of 75 mA per 1 g of the cathode active material at 25° C., and discharged down to 2.5 V at a load current of 75 mA per 1 g of the cathode active material, whereby an initial discharge capacity was obtained. Furthermore, the density of the electrode layer was obtained. Furthermore, with this battery, the cyclic charge and discharge test was sequentially carried out 30 times. As a result, the initial weight capacity density of the cathode active material at from 2.5 to 4.3 V at 25° C. was 160 mAh/g, and the capacity retention after 30 charge and discharge cycles was 99.0%. Furthermore, the same operation was carried out with another battery except that the charging voltage was changed from 4.3 V to 4.5 V, and as a result, the initial weight capacity density of the cathode active material at from 2.5 to 4.5 V was 191 mAh/g, and the capacity retention after 30 cycles was 90.7%.

Moreover, each of the other batteries was charged at 4.3 V or 4.5 V for 10 hours, and then disassembled in the argon grove box. The positive electrode sheet after charged was taken out, washed, punched into a diameter of 3 mm, and then sealed with EC in an aluminum capsule. Then, while the temperature was raised at a rate of 5° C./min by a scanning differential calorimeter, a heat generation starting temperature was measured. As a result, the heat generation starting temperature of a heat generation curve of the 4.3 V-charged product was 161° C. and the heat generation starting temperature of the 4.5 V-charged product was 143° C.

Example 2

Example of the Present Invention

An intermediate base material with a composition of LiCo$_{0.999}$Zr$_{0.001}$O$_2$ was synthesized in the same manner as in Example 1.

Then, 5.36 g of water was added to 0.64 g of an aqueous solution of zirconium ammonium carbonate having a zirconium content of 14.5 weight % to prepare a Zr aqueous solution with pH 6.0. While 6 g of the Zr aqueous solution thus prepared was sprayed over 100 g of the intermediate base material, it was mixed by means of a dram mixer to obtain a zirconium-added powder. Then the zirconium-added powder was dried at 120° C. for 4 hours, and thereafter the powder was heated at 450° C. for 12 hours in an oxygen-containing atmosphere to obtain a substantially spherical powder of lithium-containing composite oxide (composition: Li$_{0.999}$CO$_{0.998}$Z$_{0.002}$O$_{1.998}$) of the present invention with an average particle size of 13.1 μm, D10 of 7.7 μm, D90 of 18.5 μm and a specific surface area of 0.32 m$^2$/g. Furthermore, zirconium contained in the lithium-containing composite oxide powder was in an atomic ratio of 0.0020 to a total of cobalt and zirconium.

With the lithium-containing composite oxide powder thus obtained, an X-ray diffraction spectrum was measured in the same manner as in Example 1. In the powder X-ray diffraction analysis using CuKα radiation, the half-value width of the diffraction peak of the (110) plane at 2θ=66.5±1° was 0.108°. The press density of this powder was 3.03 g/cm$^3$.

Furthermore, with the lithium-containing composite oxide powder thus obtained, the atomic ratio (Zr/N) of the composite oxide was measured by the XPS analysis in the same manner as in Example 1 and was found to be (Zr/N)=1.81. Furthermore, the atomic ratio (C/Zr) was measured in the same manner as in Example 1 and was found to be (C/Zr)=0.34.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 159 mAh/g, and the capacity retention after the 30 charge and discharge cycles was 99.2%.

The initial weight capacity density of the cathode active material at from 2.5 to 4.5 V at 25° C. was 190 mAh/g, and the capacity retention after the 30 charge and discharge cycles was 91.5%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 160° C. and the heat generation starting temperature of the 4.5 V-charged product was 142° C.

Example 3

Example of the Present Invention

An intermediate base material with a composition of LiCo$_{0.999}$Zr$_{0.001}$O$_2$ was synthesized in the same manner as in Example 1.

Then, 2.79 g of water was added to 3.21 g of an aqueous solution of zirconium ammonium carbonate having a zirconium content of 14.5 weight % to prepare a Zr aqueous solution with pH 6.0. While 6 g of the Zr aqueous solution thus prepared was sprayed over 100 g of the above intermediate base material, it was mixed by means of a dram mixer to obtain a zirconium-added powder. Furthermore, the zirconium-added powder was dried at 120° C. for 4 hours, and thereafter the powder was heated at 450° C. for 12 hours in an oxygen-containing atmosphere to obtain a substantially spherical powder of lithium-containing composite oxide (composition: $Li_{0.995}CO_{0.994}Z_{0.006}O_{1.99}$) of the present invention with an average particle size of 12.9 µm, D10 of 6.7 µm, D90 of 17.8 µm and a specific surface area of 0.39 m²/g. Furthermore, zirconium contained in the lithium-containing composite oxide powder was in an atomic ratio of 0.0060 to a total of cobalt and zirconium.

With the lithium-containing composite oxide powder thus obtained, an X-ray diffraction spectrum was measured in the same manner as in Example 1. In the powder X-ray diffraction analysis using CuKα radiation, the half-value width of the diffraction peak of the (110) plane at 2θ=66.5±1° was 0.105°. The press density of this powder was 3.00 g/cm³.

Furthermore, with the lithium-containing composite oxide powder thus obtained, the atomic ratio (Zr/N) of the composite oxide was measured by the XPS analysis in the same manner as in Example 1 and was found to be (Zr/N)=2.28. The atomic ratio (C/Zr) was measured in the same manner as in Example 1 and was found to be (C/Zr)=0.25.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 157 mAh/g, and the capacity retention after the 30 charge and discharge cycles was 99.5%.

The initial weight capacity density of the cathode active material at from 2.5 to 4.5 V at 25° C. was 190 mAh/g, and the capacity retention after the 30 charge and discharge cycles was 92.3%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 162° C. and the heat generation starting temperature of the 4.5 V-charged product was 140° C.

Example 4

Example of the Present Invention

An intermediate base material with a composition of $LiCo_{0.999}Z_{0.001}O_2$ was synthesized in the same manner as in Example 1.

Then, 7.18 kg of water was added to 0.32 kg of an aqueous solution of zirconium ammonium carbonate having a zirconium content of 14.5 weight %, to prepare a Zr aqueous solution with pH 6.0. 10 kg of the above intermediate base material was filled in a Redige mixer, and heated to 80° C. under mixing, and then the intermediate base material was mixed and dried while spraying 7.5 kg of the Zr aqueous solution, to obtain a zirconium-added powder. The zirconium-added powder was heated in an oxygen-containing atmosphere at 450° C. for 12 hours to obtain a substantially spherical powder of lithium-containing composite oxide (composition: $Li_{0.995}CO_{0.994}Zr_{0.006}O_{1.99}$) of the present invention with an average particle size of 13.2 µm, D10 of 7.0 µm, D90 of 18.1 µm and a specific surface area of 0.42 m²/g. Furthermore, zirconium contained in the lithium-containing composite oxide powder was in an atomic ratio of 0.0060 to a total of cobalt and zirconium.

With the lithium-containing composite oxide powder thus obtained, an X-ray diffraction spectrum was obtained in the same manner as in Example 1. In the powder X-ray diffraction analysis using CuKα radiation, the half-value width of the diffraction peak of the (110) plane at 2θ=66.5±1° was 0.105°. The press density of this powder was 3.01 g/cm³.

Furthermore, with the lithium-containing composite oxide powder thus obtained, the atomic ratio (Zr/N) of the composite oxide was measured by the XPS analysis in the same manner as in Example 1 and was found to be (Zr/N)=1.91. The atomic ratio (C/Zr) was measured in the same manner as in Example 1 and was found to be (C/Zr)=0.21.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 156 mAh/g, and the capacity retention after the 30 times of charge and discharge cycle was 99.6%.

The initial weight capacity density of the cathode active material at from 2.5 to 4.5 V at 25° C. was 189 mAh/g, and the capacity retention after the 30 charge and discharge cycles was 92.0%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 161° C. and the heat generation starting temperature of the 4.5 V-charged product was 142° C.

Example 5

Comparative Example

Evaluation was conducted in the same manner as in Example 1 except that the coating treatment was not executed for the intermediate base material with a composition of $LiCo_{0.999}Zr_{0.001}O_2$ obtained in Example 1. The substantially spherical powder of lithium-containing composite oxide (composition: $LiCo_{0.999}Z_{0.001}O_2$) thus obtained had an average particle size of 12.1 µm, D10 of 6.7 µm, D90 of 17.7 µm and a specific surface area of 0.30 m²/g, and an X-ray diffraction spectrum was measured in the same manner as in Example 1. In the powder X-ray diffraction analysis using CuKα radiation, the half-value width of the diffraction peak of the (110) plane at 2θ=66.5±1° was 0.116°. Zirconium contained in the lithium-containing composite oxide powder was in an atomic ratio of 0.001 to a total of cobalt and zirconium. The press density of this powder was 3.07 g/cm³.

Furthermore, with the lithium-containing composite oxide powder thus obtained, the atomic ratio (Zr/N) of the composite oxide was measured by the XPS analysis in the same manner as in Example 1 and was found to be (Zr/N)=0.10. The atomic ratio (C/Zr) was measured in the same manner as in Example 1 and was found to be (C/Zr)=0.14.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 160 mAh/g, and the capacity retention after the 30 charge and discharge cycles was 98.4%.

The initial weight capacity density of the cathode active material at from 2.5 to 4.5 V at 25° C. was 190 mAh/g, and the capacity retention after the 30 charge and discharge cycles was 87.5%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 160° C. and the heat generation starting temperature of the 4.5 V-charged product was 140° C.

Example 6

Comparative Example 70 g of water was added to 6.42 g of an aqueous solution of zirconium ammonium carbonate with the zirconium content of 14.5 weight % and stirred to prepare an aqueous solution in which the above compound was uniformly dissolved. A powder was prepared by drying at 80° C. a slurry obtained by adding the above Zr-containing aqueous solution to 202.68 g of cobalt oxyhydroxide having a cobalt content of 59.0 weight %, mixed with 75.69 g of lithium carbonate having the lithium content of 18.7 weight %, and fired at 1010° C. in an oxygen-containing atmosphere for 14 hours to obtain a lithium-containing composite oxide of substantially spherical shape (composition: $LiCo_{0.995}Zr_{0.005}O_2$) with an average particle size of 12.5 μm, D10 of 6.9 μm, D90 of 18.1 μm and a specific surface area of 0.33 m$^2$/g. Zirconium contained in the lithium-containing composite oxide powder was in the atomic ratio of 0.005 to a total of cobalt and zirconium.

With the lithium-containing composite oxide powder thus obtained, an X-ray diffraction spectrum was measured in the same manner as in Example 1 except that the coating treatment was not executed. In the powder X-ray diffraction analysis using CuKα radiation, the half-value width of the diffraction peak of the (110) plane at 2θ=66.5±1° was 0.120°. The press density of this powder was 3.03 g/cm$^3$.

Furthermore, with the lithium-containing composite oxide powder thus obtained, the atomic ratio (Zr/N) of the composite oxide was measured by the XPS analysis in the same manner as in Example 1 and was found to be (Zr/N)=0.49. The atomic ratio (C/Zr) was measured in the same manner as in Example 1 and was found to be (C/Zr)=0.04.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 158 mAh/g, and the capacity retention after the 30 charge and discharge cycles was 98.8%.

The initial weight capacity density of the cathode active material at from 2.5 to 4.5 V at 25° C. was 188 mAh/g, and the capacity retention after the 30 times of charge and discharge cycle was 89.2%.

Furthermore, while the temperature was raised at a rate of 5° C./min by a scanning differential calorimeter, a heat generation starting temperature was measured and as a result, the heat generation starting temperature of a heat generation curve of the 4.3 V-charged product was 161° C. and the heat generation starting temperature of the 4.5 V-charged product was 141° C.

Example 7

Comparative Example

The intermediate base material with the composition of $LiCo_{0.999}Zr_{0.001}O_2$ obtained in Example 5 was used. Furthermore, 7.4 kg of water was added to 0.06 kg of an aqueous solution of zirconium ammonium carbonate having a zirconium content of 14.5 weight % to prepare a Zr aqueous solution with pH 6.0. 10 kg of the above intermediate base material was filled in a Redige mixer, and heated to 80° C. under mixing, and then, while spraying 7.5 kg of the Zr aqueous solution, the intermediate base material was mixed and dried to obtain a zirconium-added powder. The zirconium-added powder was heated in an oxygen-containing atmosphere at 450° C. for 12 hours to obtain a substantially spherical powder of lithium-containing composite oxide (composition: $Li_{0.999}Co_{0.998}Zr_{0.002}O_{1.998}$) with an average particle size of 12.2 μm, D10 of 7.2 μm, D90 of 17.8 μm and a specific surface area of 0.32 m$^2$/g. Zirconium contained in the lithium-containing composite oxide powder was in an atomic ratio of 0.0020 to a total of cobalt and zirconium.

With the lithium-containing composite oxide powder thus obtained, an X-ray diffraction spectrum was measured in the same manner as in Example 1. In the powder X-ray diffraction analysis using CuKα radiation, the half-value width of the diffraction peak of the (110) plane at 2θ=66.5±1° was 0.110°. The press density of this powder was 3.03 g/cm$^3$.

Furthermore, with the lithium-containing composite oxide powder thus obtained, the atomic ratio (Zr/N) of the composite oxide was measured by the XPS analysis in the same manner as in Example 1 and was found to be (Zr/N)=0.57. The atomic ratio (C/Zr) was measured in the same manner as in Example 1 and was found to be (C/Zr)=0.17.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 160 mAh/g, and the capacity retention after the 30 charge and discharge cycles was 99.1%.

The initial weight capacity density of the cathode active material at from 2.5 to 4.5 V at 25° C. was 183 mAh/g, and the capacity retention after the 30 charge and discharge cycles was 89.4%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 163° C. and the heat generation starting temperature of the 4.5 V-charged product was 143° C.

Example 8

Example of the Present Invention 59.0 g of water was added to 1.20 g of magnesium hydroxide having a magnesium content of 41.6 weight % and 6.05 g of citric acid and stirred to completely dissolve the solid content, and thereafter, 12.33 g of a basic aqueous solution of aluminum lactate having an aluminum content of 4.5 weight % was added thereto and stirred. Furthermore, 1.29 g of an aqueous solution of zirconium ammonium carbonate having a zirconium content of 14.5 weight % was added to the aqueous solution to obtain a metal-containing aqueous solution with pH 3.2. 200.97 g of cobalt oxyhydroxide having a cobalt content of 59.0 weight % was added to the aqueous solution to obtain a slurry. This slurry was dried at 80° C., 77.04 g of lithium carbonate having a lithium content of 18.7 weight % was added and mixed in the slurry, and the mixture was dried at 120° C. for 4 hours to obtain a dry powder. This dry powder was heated at 1010° C. in an oxygen-containing atmosphere for 14 hours to obtain an intermediate base material with a composition of $Li_{1.01}Co_{0.979}Al_{0.01}Mg_{0.01}Zr_{0.001}O_{2.01}$, an average particle size of 13.0 μm, D10 of 7.2 μm, D90 of 18.1 μm and a specific surface area of 0.32 m$^2$/g.

Then, 10.71 g of water was added to 1.29 g of an aqueous solution of zirconium ammonium carbonate with a zirconium content of 14.5 weight % to prepare a Zr aqueous solution with pH 6.0. While 6 g of the Zr aqueous solution thus prepared was sprayed over 100 g of the above intermediate base material, it was mixed by means of a dram mixer to obtain a zirconium-added powder. Furthermore, the zirconium-added powder was dried at 120° C. for 4 hours, and thereafter the powder was heated at 450° C. in an oxygen-containing atmosphere for 12 hours to obtain a substantially spherical powder of lithium-containing composite oxide (composition: $Li_{1.009}Co_{0.978}Mg_{0.01}Al_{0.01}Zr_{0.002}O_{2.009}$) of the present invention with an average particle size of 13.0 μm, D10 of 7.2 μm, D90 of 18.1 μm and a specific surface area of 0.32 m$^2$/g. Furthermore, Zirconium contained in the lithium-containing composite oxide powder was in the atomic ratio of 0.0020 to a total of cobalt, aluminum, magnesium and zirconium.

With the lithium-containing composite oxide powder thus obtained, an X-ray diffraction spectrum was obtained in the same manner as in Example 1. In the powder X-ray diffraction analysis using CuKα radiation, the half-value width of the diffraction peak of the (110) plane at 2θ=66.5±1° was 0.110°. The press density of this powder was 3.02 g/cm$^3$.

Furthermore, with the lithium-containing composite oxide powder thus obtained, the atomic ratio (Zr/N) of the composite oxide was measured by the XPS analysis in the same manner as in Example 1 and was found to be (Zr/N)=1.90. The atomic ratio (C/Zr) was measured in the same manner as in Example 1 and was found to be (C/Zr)=0.36.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 153 mAh/g, and the capacity retention after the 30 charge and discharge cycles was 99.7%.

The initial weight capacity density of the cathode active material at from 2.5 to 4.5 V at 25° C. was 184 mAh/g, and the capacity retention after the 30 charge and discharge cycles was 92.8%.

Furthermore, while the temperature was raised at a rate of 5° C./min by a scanning differential calorimeter, a heat generation starting temperature was measured and as a result, the heat generation starting temperature of a heat generation curve of the 4.3 V-charged product was 175° C. and the heat generation starting temperature of the 4.5 V-charged product was 150° C.

Example 9

Comparative Example

Evaluation was conducted in the same manner as in Example 1 except that the coating treatment was not executed for the intermediate base material with the composition of $Li_{1.01}Co_{0.979}Al_{0.01}Mg_{0.01}Zr_{0.001}O_{2.01}$ obtained in Example 8. The substantially spherical powder of lithium-containing composite oxide (composition: $Li_{1.01}Co_{0.979}Al_{0.01}Mg_{0.01}Zr_{0.001}O_{2.01}$) thus obtained had an average particle size of 12.8 μm, D10 of 6.9 μm, D90 of 18.2 μm and a specific surface area of 0.30 m$^2$/g, and an X-ray diffraction spectrum was measured in the same manner as in Example 1. In the powder X-ray diffraction analysis using CuKα radiation, the half-value width of the diffraction peak of the (110) plane at 2θ=66.5±1° was 0.108°. The press density of this powder was 3.05 g/cm$^3$. Zirconium contained in the lithium-containing composite oxide powder was in the atomic ratio of 0.001 to a total of cobalt, aluminum, magnesium and zirconium.

Furthermore, with the lithium-containing composite oxide powder thus obtained, the atomic ratio (Zr/N) of the composite oxide was measured by the XPS analysis in the same manner as in Example 1 and was found to be (Zr/N)=0.10. The atomic ratio (C/Zr) was measured in the same manner as in Example 1 and was found to be (C/Zr)=0.16.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 154 mAh/g, and the capacity retention after the 30 charge and discharge cycles was 99.0%.

The initial weight capacity density of the cathode active material at from 2.5 to 4.5 V at 25° C. was 185 mAh/g, and the capacity retention after the 30 charge and discharge cycles was 88.9%.

Furthermore, while the temperature was raised at a rate of 5° C./min by a scanning differential calorimeter, a heat generation starting temperature was measured and as a result, the heat generation starting temperature of a heat generation curve of the 4.3 V-charged product was 174° C. and the heat generation starting temperature of the 4.5 V-charged product was 149° C.

Example 10

Example of the Present Invention

An aqueous sulfate solution containing nickel sulfate, cobalt sulfate and manganese sulfate, an ammonium sulfate aqueous solution and a sodium hydroxide aqueous solution each were continuously supplied into a reaction vessel under stirring so that the pH of the slurry in the reaction vessel became 11.0 and the temperature became 50° C. The fluid volume in the reaction system was controlled by an overflow method and a co-precipitated slurry overflown was filtered, washed with water and then dried at 80° C. to obtain a nickel-cobalt-manganese composite hydroxide powder.

The hydroxide thus obtained was dispersed in 6 weight % of an aqueous solution of sodium persulfate containing 3 weight % of sodium hydroxide and stirred at 20° C. for 12 hours to synthesize a nickel-cobalt-manganese composite oxyhydroxide slurry, followed by filtration and drying steps to obtain a composite oxyhydroxide powder. The specific surface area of the powder by a nitrogen adsorption method was 9.6 m$^2$/g and an average particle size measured by means of a laser scattering particle size distribution measuring apparatus was 10.1 μm.

A predetermined amount of a lithium carbonate powder with an average particle size of 20 μm was mixed in the composite oxyhydroxide powder and fired at 1000° C. in an atmosphere maintained at the oxygen concentration of 40%, for 16 hours, followed by mixing and pulverizing to obtain an intermediate base material having a composition of $Li_{1.05}Ni_{1/3}Co_{1/3}Mn_{1/3}O_{2.05}$. The intermediate base material was a rhombohedral system (R-3m) analogue in a powder X-ray diffraction spectrum using CuKα radiation, and it was found by SEM observation that particles of the powder were secondary particles resulting from agglomeration of many primary particles and the shape was substantially spherical or elliptical.

On the other hand, water was added to an aqueous solution of zirconium ammonium carbonate (chemical formula: $(NH_4)_2[Zr(CO_3)_2(OH)_2]$) with a zirconium content of 14.5 weight % to prepare a zirconium aqueous solution with a zirconium content of 1.58 weight % and pH 8.5.

While 6 g of the zirconium aqueous solution thus prepared was sprayed over 100 g of the above intermediate base material, it was mixed by means of a dram mixer to obtain a zirconium-added powder. Furthermore, the zirconium-added powder was dried at 350° C. for 12 hours to obtain a substantially spherical powder of lithium-containing composite oxide (composition: $Li_{1.049}Ni_{0.333}Co_{0.333}Mn_{0.333}Zr_{0.001}O_{2.049}$) of the present invention.

The lithium-containing composite oxide power obtained had an average particle size of 10.7 μm, D10 of 5.5 μm, D90 of 14.0 μm and a specific surface area of 0.47 m²/g. In the powder X-ray diffraction analysis with an X-ray diffraction apparatus (RINT 2100 model, manufactured by Rigaku Corporation) using CuKα radiation, the half-value width of the diffraction peak of the (110) plane at 2θ=65.1±1° was 0.228°. The press density of this powder was 2.68 g/cm³. Zirconium contained in the lithium-containing composite oxide powder was in the atomic ratio of 0.0010 to a total of nickel, manganese, cobalt and zirconium.

Furthermore, with the lithium-containing composite oxide powder thus obtained, the surface element analysis using the XPS analysis was conducted in the same manner as in Example 1, and as a result, the atomic ratio (Zr/N) of the composite oxide was found to be (Zr/N)=2.42. In addition, the atomic ratio (C/Zr) was measured in the same manner as in Example 1 and was found to be (C/Zr)=0.38.

A positive electrode sheet was prepared using the above zirconium-coated lithium-containing composite oxide powder, batteries were assembled in the same manner as in Example 1, and their properties were measured. The initial weight capacity density of the cathode active material charged to 4.3 V was 158 mAh/g, and the capacity retention after the 30 charge and discharge cycles was 98.8%; the initial weight capacity density charged to 4.5 V was 172 mAh/g, and the capacity retention after the 30 charge and discharge cycles was 94.0%. Furthermore, the heat generation starting temperature of a heat generation curve of the 4.3 V-charged product was 235° C. and the heat generation starting temperature of the 4.5 V-charged product was 198° C.

Example 11

Comparative Example

A lithium-containing oxide with a composition of $Li_{1.05}Ni_{1/3}Co_{1/3}Mn_{1/3}O_2$ after fired was synthesized in the same manner as in Example 1 except that the coating treatment was not executed for the intermediate base material with the composition of $Li_{1.05}Ni_{1/3}Co_{1/3}Mn_{1/3}O_{2.05}$ obtained in Example 10. A powder of the lithium-containing oxide was obtained in the composition of $Li_{1.05}Ni_{1/3}Co_{1/3}Mn_{1/3}O_{2.05}$ and in the form of secondary particles resulting from agglomeration of many primary particles with an average particle size of 10.5 μm, D10 of 5.3 μm, D90 of 13.5 μm, and a specific surface area of 0.49 m²/g. With the composite oxide powder thus obtained, an X-ray diffraction spectrum was obtained with an X-ray diffraction apparatus (RINT 2100 model, manufactured by Rigaku Corporation). In the powder X-ray diffraction analysis using CuKα radiation, the half-value width of the diffraction peak of the (110) plane near 2θ=65.1±1° was 0.225°. The press density of this powder was 2.70 g/cm³.

Furthermore, with the lithium-containing composite oxide powder thus obtained, the surface element analysis using the XPS analysis was conducted in the same manner as in Example 1 and no zirconium was detected.

The positive electrode sheet was prepared using the above lithium-containing composite oxide powder, batteries were assembled in the same manner as in Example 1, and their properties were measured. The initial weight capacity density of the cathode active material charged to 4.3 V was 160 mAh/g, and the capacity retention after the 30 charge and discharge cycles was 95.0%; the initial weight capacity density charged to 4.5 V was 175 mAh/g, and the capacity retention after the 30 charge and discharge cycles was 91.0%. Furthermore, a heat generation starting temperature of a heat generation curve of the 4.3 V-charged product was 232° C. and the heat generation starting temperature of the 4.5 V-charged product was 199° C.

INDUSTRIAL APPLICABILITY

The present invention provides the cathode active material with high operating voltage, high volume capacity density, high safety and excellent charge and discharge cyclic properties suitably applicable to the non-aqueous electrolyte secondary battery such as the lithium secondary battery being small in size and light in weight and having a high energy density.

The entire disclosure of Japanese Patent Application No. 2006-056610 filed on Mar. 2, 2006 including the specification, claims, drawings and summary is incorporated herein by reference in its entirety.

What is claimed is:

1. A cathode active material comprising a lithium-containing composite oxide powder represented by the formula

wherein

N is Co,

M is zirconium and optionally at least one element selected from the group consisting of Al, alkaline earth metal elements and transition metal elements other than cobalt, $0.9 \leq p \leq 1.1$, $0.965 \leq x \leq 1.00$, $0 \leq y \leq 0.035$, $1.9 \leq z \leq 2.1$, x+y=1 and $0 \leq a \leq 0.02$, and an atomic ratio of zirconium/cobalt in a surface layer within 5 nm of the surface is from 1.0 to 4.0, and wherein the cathode active material is for a non-aqueous electrolyte secondary battery.

2. The cathode active material according to claim 1, wherein the lithium-containing composite oxide powder comprises zirconium in an atomic ratio of from 0.00005 to 0.01 relative to a total of the element M and the cobalt.

3. The cathode active material according to claim 1, wherein $0.975 \leq x \leq 0.995$ and $0.005 \leq y \leq 0.025$.

4. The cathode active material according to claim 1, wherein the element M is zirconium and at least one element selected from the group consisting of magnesium and aluminum.

5. The cathode active material according to claim 1, further comprising carbon in the surface layer within 5 nm.

6. A positive electrode for a lithium secondary battery comprising:
the cathode active material according to claim 1;
an electrical conducting material; and
a binder.

7. A lithium secondary battery comprising:
the positive electrode according to claim 6;
a negative electrode; and
a non-aqueous electrolyte.

8. A process for producing the cathode active material according to claim 1, comprising:
applying a zirconium-containing aqueous solution to a lithium-containing composite oxide powder, with stirring under low shear;
to obtain a zirconium-added powder having a dense and uniform film of zirconium near the surface of the lithium-containing composite oxide powder, and
firing the zirconium-added powder in an atmosphere comprising oxygen.

9. The process according to claim 8, wherein
a pH of the applied zirconium aqueous solution is from 3 to 12
the zirconium aqueous solution is applied to the lithium-containing composite oxide powder by spraying thereto, and
a temperature of the firing the zirconium-added powder is from 200 to 600° C.

10. The process according to claim 9, wherein the zirconium aqueous solution comprises zirconium ammonium carbonate or a zirconium ammonium halide.

* * * * *